Jan. 30, 1940.  V. A. VON HAASE  2,188,799

PRETZEL MACHINE

Original Filed Aug. 14, 1935

INVENTOR.
Victor A. von Haase.
BY
George V. Woodling
ATTORNEY.

Patented Jan. 30, 1940

2,188,799

UNITED STATES PATENT OFFICE 2,188,799

PRETZEL MACHINE

Victor A. von Haase, Rocky River, Ohio, assignor to The Victor Development and Patent Company, Cleveland, Ohio, a corporation of Ohio Substitute for abandoned application Serial No. 36,161, August 14, 1935. This application June 28, 1939, Serial No. 281,717

9 Claims. (Cl. 107—14)

My invention relates, in general, to pretzel machines or the like and more particularly to machines for forming pretzels and other objects by extruding the dough or other soft pliable substances through an opening having an outline defining the shape of the object to be formed.

This application is a substitute for my abandoned application, Serial No. 36,161 filed August 14, 1935.

An object of my invention is to provide for extruding the dough or other soft pliable substances through an opening having a shape which defines the outline of the objects to be formed, and for slicing the extruding dough or other soft pliable substances as it is extruded through the said opening.

Another object of my invention is to provide for varying the relative speed at which the extruded dough or other soft pliable substances is sliced off and the speed at which the dough or other soft pliable substances is extruded through the opening.

Another object of my invention is the provision of a compressor having a screw propeller for extruding or compressing the dough or other soft pliable substances through an opening having a shape which defines the outline of the objects to be formed, and a cooperatively associated cutting device adapted to slice the extruded dough or other pliable substances as it is extruded through the said opening.

A further object of my invention is the provision of a hopper for feeding the dough or other pliable substances into the compressor, the arrangement of the hopper being such that the side walls thereof, slope outwardly in order to prevent the dough or other pliable substances from sticking to the inside walls of the hopper.

A still further object of my invention is the provision of a removable forming header for the compressor having a removable die forming face.

A still further object of my invention is the provision of a conveyor for conveying the formed pretzels or other objects to the oven or other processing devices.

Another object of my invention is to provide for positioning the front face of the forming die at an angle to the conveyor.

Other objects and a fuller understanding of my invention may be had by referring to the following description and claims taken in combination with the accompanying drawing, in which:

While I have illustrated the principle of my invention to form pretzels, it is to be understood, however, that my invention may be utilized to form other objects such as crackers, having various outlines and shapes.

Figure 1:
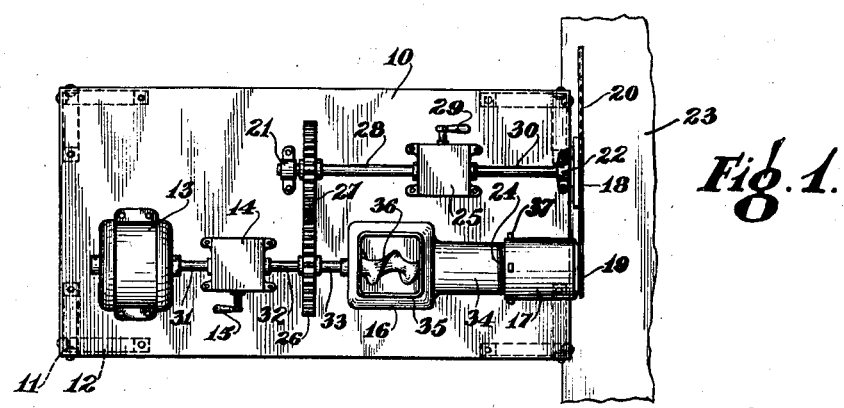
Figure 1 represents a planned view of a device embodying the features of my invention.
Figures 2, 3:
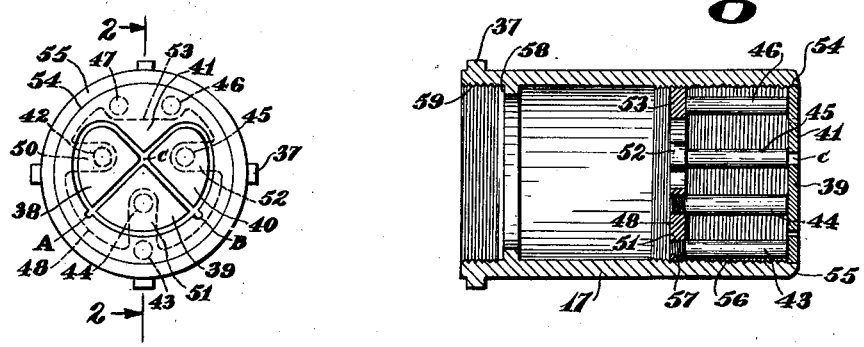
Figure 2 is a cross-sectional and longitudinal view of the die forming header.
Figure 3 is a front end view of the forming header.

The pretzels formed by my invention are of the conventional type except that the center is not twisted. With reference to Figure 3, the shape of the pretzel formed by my invention is defined by three sections; namely, ABC, AC, and BC. With reference to Figure 1, the equipment for forming the pretzels or other objects may be mounted upon a base 10 which is supported by the legs 11 that are braced by the angle supports 12. The essential parts of my invention which are mounted upon the base 10 comprises a motor 13, a dough compressor 16, a die forming header 17, a slicing device 18, and a conveyor designated generally by the reference character 23.

The dough compressor 16 comprises a forward housing 34, a hopper 35, and a screw propeller 36 which compresses or extrudes the dough through the die forming header 17. As shown best in Figure 4, the side walls of the hopper 35 are sloping outwardly so that the dough or other pliable substances do not stick or adhere to the inside walls of the hopper. Also the lowermost portion of the hopper is larger than the housing 34 so that the dough or other pliable substances may fully surround the screw propeller 36. This construction insures substantially uniform feeding of the dough to the screw propeller and thereby maintains a high degree of accuracy in the forming of the pretzels or other objects. As illustrated, the screw propeller 36 is driven by the electrical motor 13 through means of a variable speed transmission 14 having a control lever 15 which is adapted to vary the speed at which the screw propeller 36 is driven. The power delivered by the motor 13 and which drives the screw propeller 36 is transmitted first through a shaft 31, the variable speed transmission 14, and the shafts 32 and 33.

The slicing device 18 is likewise driven by the motor 13 but it is to be understood that the slicing device 18 may be driven by a separate motor. The power for driving the slicing device 18 is transmitted through gears 26 and 27, the shaft 28, the variable speed transmission 25 having a control lever 29, and a shaft 30. The variable speed transmission 25 is employed so that the relative speed between the slicing device 18 and the screw propeller 36 may be so varied as to control the thickness of the pretzels or other formed objects. As illustrated, the rearward end of the shaft 28 may be suitably supported by means of a bearing 21 and the forward end of the shaft 30 may be suitably supported by a bearing 22.

Figure 4:
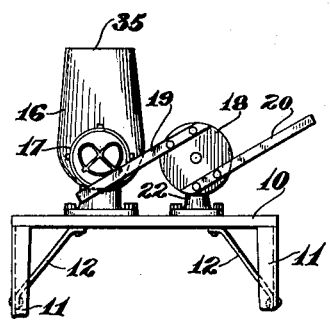
Figure 4 is a front view of the device shown in Figure 1 showing primarily a cooperative relationship between the die forming header and the slicing device.

As shown in Figures 1 and 4, the slicing device 18 has two slicing knives 19 and 20 suitably connected to the revolving flange of the slicing device 18. The slicing knives 19 and 20 are so arranged that they resiliently slide against the forward face of the forming die and slice the extruded dough or other pliable substances as it is extruded from the face of the forming die.

The die forming header 17 is provided at its left hand end with suitable internal threads 59 which are adapted to threadably engage the external threads 34 upon the forward end of the housing 34 of the dough compressor 16. The die forming header 17 is screwed upon the housing 34 of the dough compressor until the angular shoulder 58 within the die forming header 17 engages the forward end of the housing 34. In order to facilitate the turning of the die forming header 17, there are provided suitable lugs 37 adapted to be engaged by a suitable wrench. The forward end of the die forming header is provided with internal threads 56 which threadably receive a removable die forming face which is made up of a plurality of segments 38, 39, and 40 which are surrounded by a portion 41. As illustrated best in Figure 3, the segments 38, 39, and 40 and the surrounding portion 41 are so positioned that their adjacent edges are spaced apart to form an opening having the shape of a conventional pretzel. These segments 38, 39, and 40 and the portion 41 surrounding the segments are supported by a supporting ring 48 having external threads 57 that threadably engage the internal threads 56 of the die forming header 17. The supporting ring 48 is provided with a plurality of inwardly projecting supporting portions 50, 51, 52, and 53. These inwardly projecting supporting portions carry a plurality of supporting studs 42, 43, 44, 45, 46, and 47. The supporting stud 42 carries the segment 38, the supporting stud 44 carries the segment 39. The supporting stud 45 carries the segment 40 and the supporting studs 43, 46, and 47 carry the portion 41 that supports the segments 38, 39, and 40. Therefore, by means of this assembly and construction, the die forming face may be threadably removed from the die forming header 17. In this manner other shaped die forming faces may be threadably engaged in the die forming header 17 to make objects of other shapes than pretzels such as cookies, or the like. As illustrated best in Figure 2, the forward end of the die forming header 17 is machined to form a seat 54 into which the die forming face closely fits. The forward end of the die forming header 17 is rounded as indicated by the reference character 55 so that the slicing knives 19 and 20 may first engage the round edge 55 and then slide closely against the side face of the forming die.

In the operation of my device, the dough or other pliable forming substances is inserted in the hopper 35 of the compressor 16 and when the motor is started, the screw propeller 36 forces or extrudes the dough or other pliable substances through the opening in the face of the forming die. As the dough or other pliable substances is extruded, the slicing knives 18 and 19 revolve to slice off the extruded dough after which the formed pretzels or objects, falls upon the conveyor 23 and are carried to a baking oven or other processing devices. The depth of the pretzel or other objects, may be governed by the setting of the variably speed transmission 25 which varies the speed of the slicing knives 19 and 20. As shown in Figure 4, the slicing knives 19 and 20 first contact the lower right hand portion of the extruded dough or other pliable substances and moves upwardly to make the complete slice. After the extruded dough or other pliable substances is completely sliced off, it falls upon the conveyor 23. The action of the slicing knives 19 and 20, after it cuts the extruded dough or other pliable substances, is such that the pretzels or other formed objects, during the course of their fall to the conveyor 23, gradually lean over so that when the formed pretzels or other formed objects strike the conveyor 23, they are substantially horizontal, which means that there is no deformation in the outline of the formed pretzels or other objects. In Figure 1, the conveyor 23 is at a considerable distance below the die forming header 17 so that the slicing knives 19 and 20 clear the conveyor. This distance between the conveyor 23 and the die forming header 17 also gives the formed pretzels or other formed objects sufficient distance in which to fall so that they always strike the conveyor 23 in substantially a horizontal manner.

Figure 5:
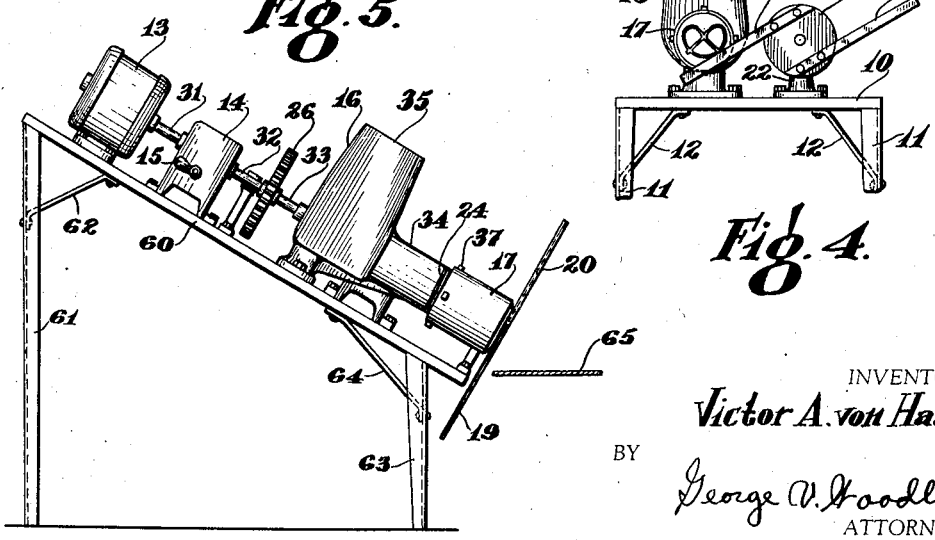
Figure 5 is a modified form of my invention in that the entire assembly is mounted at an angle to the conveyor.

In Figure 5, I show a modification of my forming machine in that the entire assembly is tilted at an angle with respect to the conveyor 65. To accomplish this, the equipment may be mounted upon an inclined base 60 supported at its rearward end by legs 61 and a supporting angle brace 62, and at its forward end by a leg 63, and angle supporting braces 64. In this embodiment of my invention, the conveyor 65 may be placed relatively close to the die forming header 17 so that the formed pretzel or other objects strike the conveyor 65 in substantially a horizontal manner. Also in Figure 5, inasmuch as the entire assembly is at an angle, the slicing knives 19 and 20 clear the closely spaced conveyor 65. The operation of the assembly in Figure 5 is the same as that previously described with reference to the preferred showing of my invention.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A header for an object forming machine, said machine having a housing comprising, in combination, an enclosed wall member having one end adapted to be attached to said housing and having the other end open, a plurality of segmental pieces arranged in substantially the same plane at said open end and in spaced relationship with respect to each other, to form an opening having an outline in the shape of the object to be formed, a member for supporting each of said segmental pieces, each said member extending rearwardly from said each segmental piece and terminating intermediate the ends of said wall member, a supporting member adapted to move through said open end of the wall member and being adapted to engage said wall member intermediate the ends of said wall member, said supporting member having a plurality of projecting portions extending radially and inwardly of said wall member, and means for fastening said longitudinal members to the said projecting portions.

2. A header for the housing of a machine for forming dough objects having open spaces comprising, in combination, a wall member having an end adapted to engage said housing and having the other end open, said wall member having a hollow opening to form a passageway for said dough, an outer die member having an opening in the shape of the outer outline of the dough object to be formed at said open end, said outer die member engaging said wall member and preventing dough from passing between the outer die member and the wall member, a plurality of island die members for forming the open spaces in said dough object, said island die members being spaced in the opening in said outer die member in relative position to each other and to the said outer die member to form an opening having the outline of said dough object to be formed, an engaging member rigidly engaging each said die member for holding the respective die members in position, said engaging members being extended inwardly and longitudinally of said wall member, supporting means engaged within said wall member, said supporting means having an open space to permit said dough to pass therethrough, a plurality of projecting portions extending radially and inwardly from said supporting means, and means for securing said engaging members to said projecting portions respectively.

3. A header for the housing of a machine for forming dough objects having open spaces comprising, in combination, a hollow wall member having one end adapted to engage said housing and having the other end open, said wall member having a flat surface portion at said open end, an outer die member having an opening in the shape of the outer outline of the dough object to be formed, the said outer die member abutting the said flat surface portion so as to prevent dough from passing between the outer die member and the wall member, a plurality of island die members for forming the open spaces in said dough object to be formed, said island die members being spaced in the opening in said outer die member in relative position to each other and to said outer die member to form an opening having the outline of said dough object to be formed, a member engaging each said island die member for holding the respective die members in position, supporting means for said members, and means for holding said supporting means in position within said wall member.

4. The combination of a header for a machine for forming dough objects having open spaces, said header having a flat forward face, the said forward face having an opening in the shape of the dough object to be formed through which the said dough is extruded and is supported in said extruded position by the header, and a knife mounted adjacent said forward face, said knife engaging and sliding across in close engagement with said flat forward face to shear off said extruded dough to form said dough objects, said knife and its relationship to the opening in the header enabling the progressively sheared off portions of the dough to remain substantially in the shape of the said opening in the header and causing the portion of the dough object which is sheared off last to be thrust away from the header with a sufficient force as to increasingly tilt the sheared off dough object and make it fall substantially flat on a receiving surface with its forward face contacting the said receiving surface.

5. The combination of a die member for a machine for forming dough objects having open spaces, said die member having an opening in the shape of the dough object to be formed through which dough is extruded, and a knife member mounted adjacent said die member and passing across the face of said die member, said knife member having a relatively sharp knife edge portion and a thicker body portion, the said knife member moving in an upward direction so that the said knife edge portion severs said extruded dough progressively from the bottom portion to the top portion of said dough, the upward movement of the said body portion and the relation of the knife to the opening in the die member being such that the said object formed from said dough is inclined so as to fall on a receiving surface substantially flat on its face.

6. The combination of a die member for a machine for forming dough objects having open spaces, said die member having an opening in the shape of the dough object to be formed through which said dough is extruded and suspended, and a knife member mounted adjacent said die member, the knife member closely engaging and passing the face of said die member in an upward direction to shear off the extruded dough, the upward movement of said knife member and the relation of the knife member to the opening in the die member being such that the extruded dough is maintained in the shape of the said object to be formed, and being such that the upper portion of the extruded dough is sheared off last and the formed dough object is inclined by the said knife member to fall on a receiving surface substantially flat on its face.

7. The combination of a header for a machine for forming dough objects having open spaces, said header having a flat forward face, the said forward face having an opening in the shape of the dough object to be formed through which the dough is extruded, a knife member arranged to slide in close engagement with and upwardly across said flat forward face to sever said extruded dough progressively from the bottom to the top, to form dough objects having open spaces, readily adjustable means for varying the relative speed between the said knife moving across said forward face and the extrusion of the dough, and actuating means for controlling the readily adjustable means.

8. The combination of a rotatable header for a machine for forming dough objects having open spaces, said header having an opening through which said dough is extruded to form the dough objects having open spaces, a knife member for shearing off the extruded dough, said knife member moving upwardly across the opening in said header, said header being rotatable so that the relative position of said opening with respect to said knife member may be established.

9. The combination of a die member for a machine for forming open pretzels out of plastic dough, the said pretzels having dough defining a central opening and two side openings, said die member having an opening in the shape of a pretzel through which said dough is extruded, and a knife member mounted adjacent said die member and closely engaging and passing the face of said die member to shear off said dough, the relation of the knife member to the opening in said die member being such that the dough defining the central opening of the pretzel is sheared off before the dough defining the two side openings of the pretzel is completely sheared off to cause the formed pretzel to fall on a receiving surface in its proper shape.

VICTOR A. von HAASE.